Figure 1:
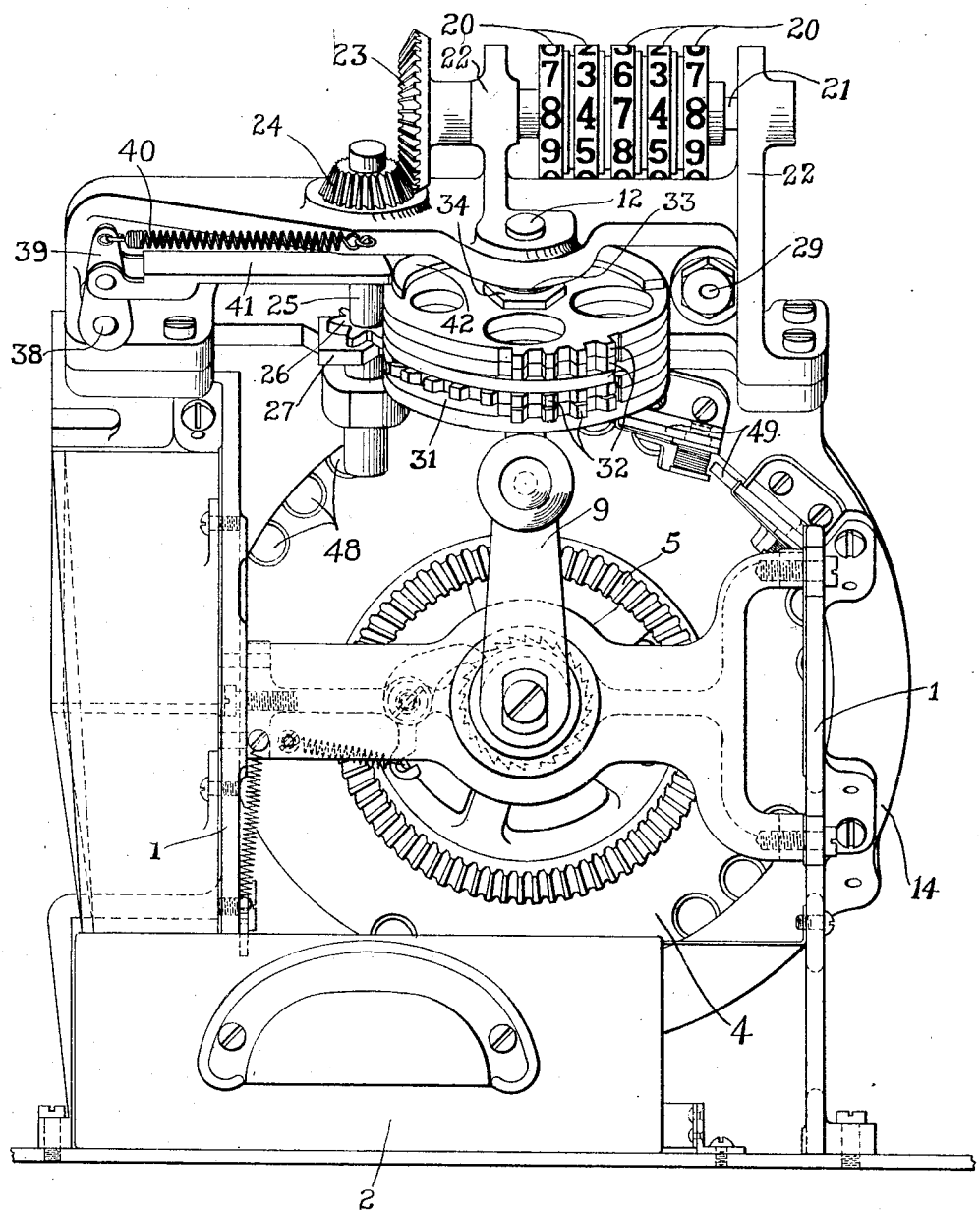

P. J. MITTEN, J. E. McALLISTER & G. E. IRELAND.
FARE BOX.
APPLICATION FILED MAR. 14, 1914.

1,190,936.

Patented July 11, 1916.
5 SHEETS—SHEET 1.

WITNESSES:
Herman A. Boehner.
H. L. Hammaker.

INVENTORS
Philip J. Mitten.
John E. McAllister.
George E. Ireland.
BY
Toulmin Reed

ATTORNEYS

P. J. MITTEN, J. E. McALLISTER & G. E. IRELAND.
FARE BOX.
APPLICATION FILED MAR. 14, 1914.

1,190,936.

Patented July 11, 1916.
5 SHEETS—SHEET 3.

WITNESSES:
Herman A. Bochner.
H. L. Hammaker.

INVENTORS
Philip J. Mitten.
John E. McAllister.
George E. Ireland.
BY
Toulmin Reed & Toulmin
ATTORNEYS P. J. MITTEN, J. E. McALLISTER & G. E. IRELAND.
FARE BOX.
APPLICATION FILED MAR. 14, 1914.

1,190,936.

Patented July 11, 1916.
5 SHEETS—SHEET 4.

WITNESSES:
Herman A. Boehner.
H. L. Hammaker

INVENTORS
Philip J. Mitten.
John E. McAllister.
George E. Ireland.
BY
Toulmin Read & Toulmin
ATTORNEYS P. J. MITTEN, J. E. McALLISTER & G. E. IRELAND.
FARE BOX.
APPLICATION FILED MAR. 14, 1914.
1,190,936. Patented July 11, 1916.
5 SHEETS—SHEET 5.
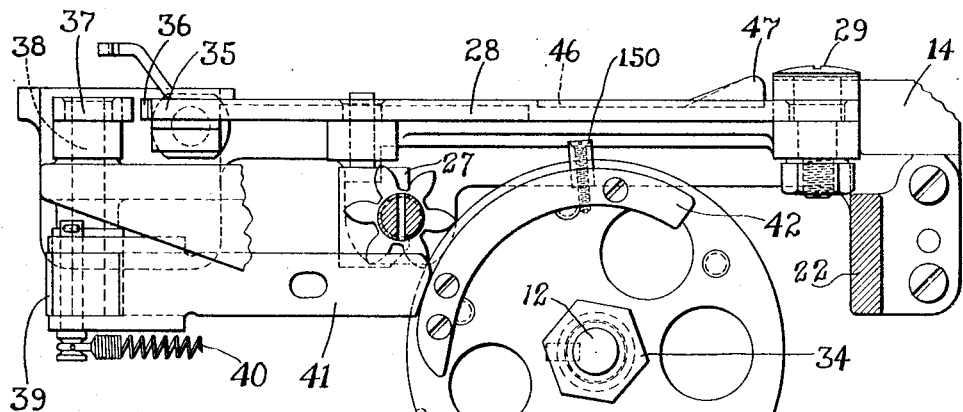
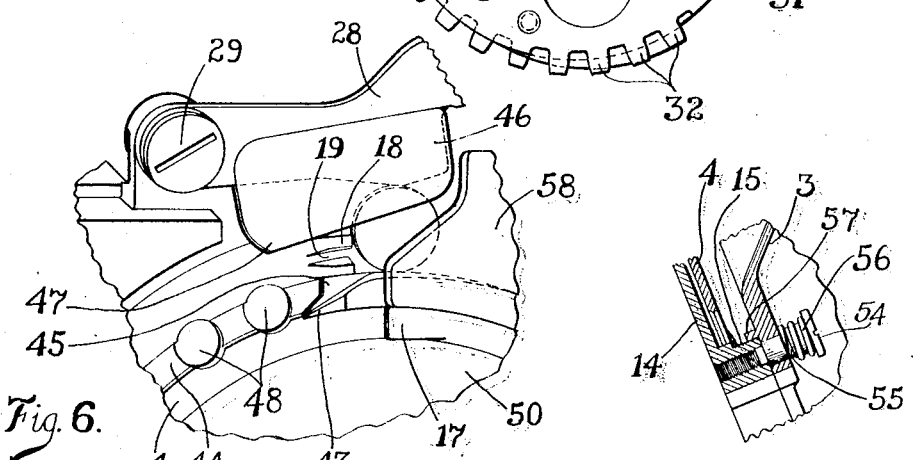
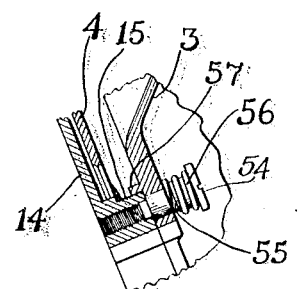
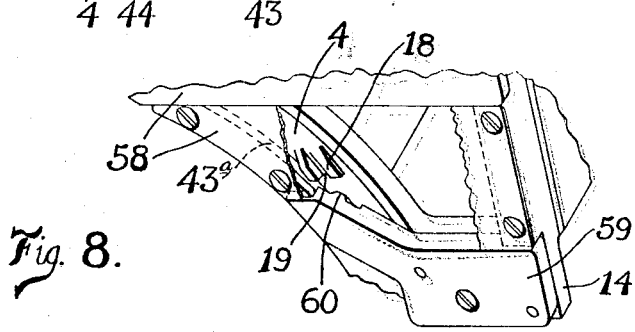
WITNESSES:
Herman A. Bochner.
H. L. Hammaker.
INVENTORS
Philip J. Mitten.
John E. McAllister.
George E. Ireland.
BY
ATTORNEYS

UNITED STATES PATENT OFFICE.

PHILIP J. MITTEN OF OAKWOOD VILLAGE, AND JOHN E. McALLISTER AND GEORGE E. IRELAND, OF DAYTON, OHIO, ASSIGNORS TO THE RECORDING REGISTER AND FARE BOX COMPANY, OF NEW HAVEN, CONNECTICUT, A CORPORATION OF CONNECTICUT.

FARE-BOX.

1,190,936.   Specification of Letters Patent.   Patented July 11, 1916.

Application filed March 14, 1914. Serial No. 824,681.

*To all whom it may concern:*

Be it known that we, PHILIP J. MITTEN, JOHN E. McALLISTER, and GEORGE E. IRELAND, citizens of the United States, said MITTEN residing at Oakwood Village and said McALLISTER and IRELAND at Dayton, in the county of Montgomery and State of Ohio, have invented certain new and useful Improvements in Fare-Boxes, of which the following is a specification, reference being had therein to the accompanying drawing.

This invention relates to recording fare boxes and is in the nature of an improvement upon the fare box shown and described in applications for patents, Ser. Nos. 762,506 and 774,599, filed by Frank B. Kennedy April 21, 1913, and June 19, 1913, respectively.

The object of the present invention is to improve the detail construction of the machine, refining the same mechanically and providing structural features and modifications which will render the operation of the device more certain, and will make it practically impossible for the device either to fail to register any coin received therein or to make a false registration.

To this end it is a further object of the invention to provide improved means for preventing the downward movement of the measuring arm or lever from being interrupted before the pinion has reached its operative position; to provide means for locking the actuating pinion against operative movement by any coin which is not properly seated in the coin lifting pocket on the disk; to provide means whereby the coin will be positively lifted from the coin seat onto the fixed support and will be effectually prevented from entering back of this fixed support even though it may be very thin; to so construct the discharge chute that coins will be effectually discharged therefrom and will not be liable to stick or pile up in the chute;
to provide the coin lifting disk with means for preventing the coins from sticking to the face thereof and moving therewith; to so construct the hopper that the coins will not become wedged therein in such a manner as to interrupt the movement of the disk; to provide a bearing surface for the disk which will reduce the friction between the parts and will prevent the disk from adhering to its bearing surface due to the corrosion of the parts; and further, to provide means for adjusting the rotary racks.

Figure 2:
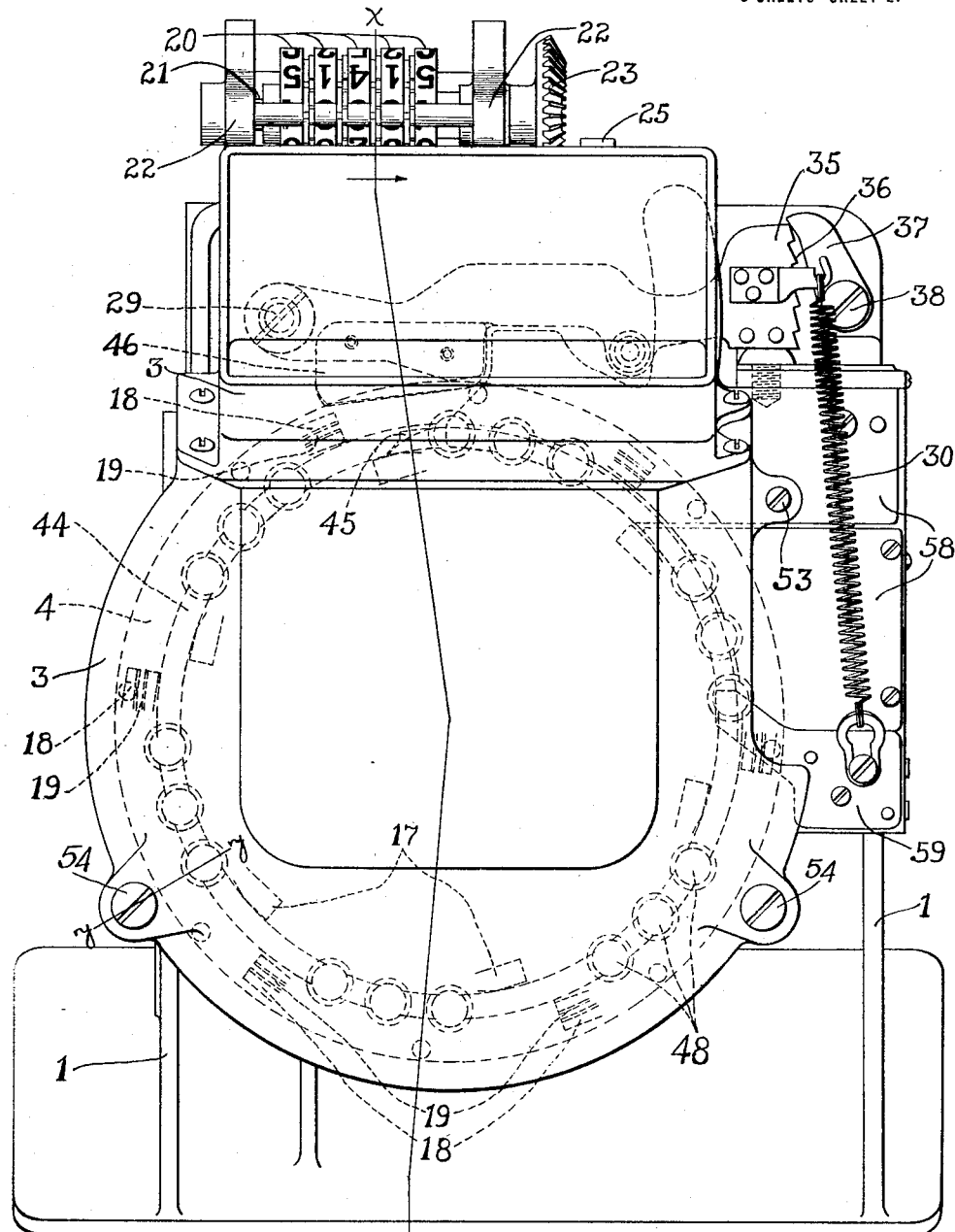
Figure 3:
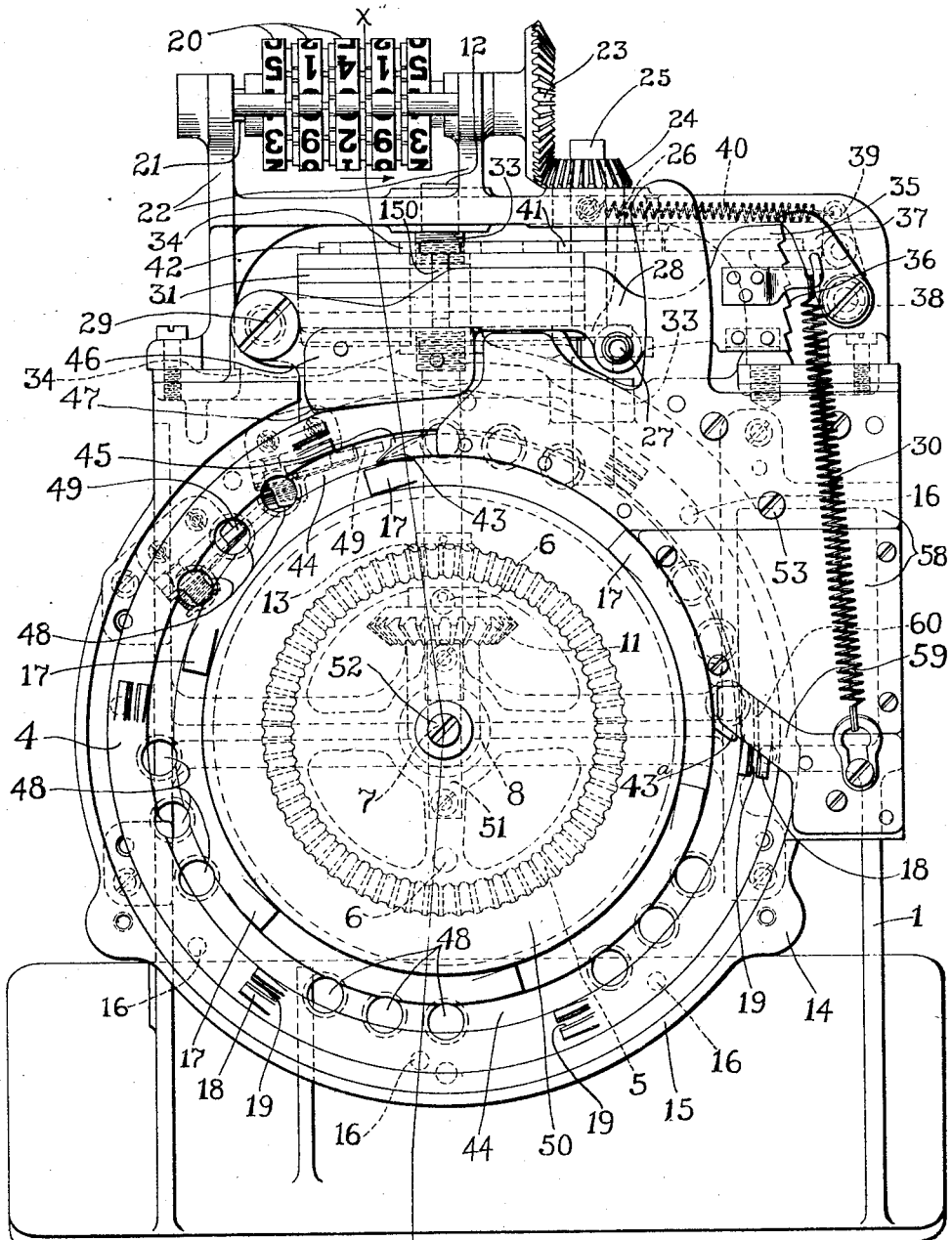
Figure 4:
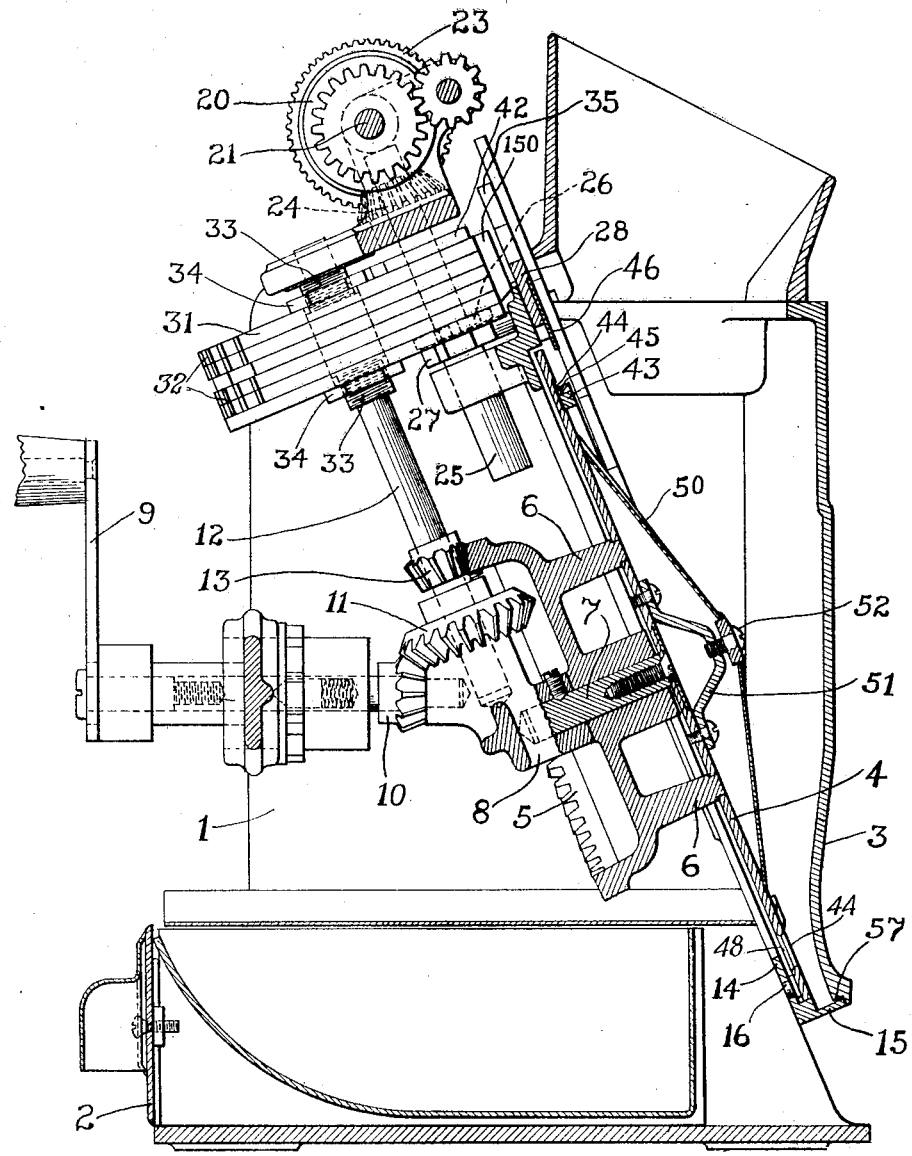

In the accompanying drawings, Figure 1 is a rear elevation of the mechanism embodying our invention: Fig. 2 is a front elevation of the same: Fig. 3 is a front elevation of the mechanism with the hopper removed; Fig. 4 is a vertical section taken on the line *x x* of Figs. 2 and 3; Fig. 5 is a top plan view of the register operating devices with the upper portions of the frame and the register broken away; Fig. 6 is an enlarged detail view of the coin lifting device and the guard for the measuring arm; Fig. 7 is a detail view of the yieldable fastening for the lower edge of the hopper wall; and Fig. 8 is a detail view of the lower portion of the coin chute.

In these drawings the invention has been illustrated as applied to a fare box similar in its main features of construction to that shown and described in application, Ser. No. 774,599, above mentioned. This fare box comprises a main supporting frame 1 in which is slidably mounted a cash-drawer 2. Mounted on the frame is a hopper 3 having a substantially vertical main portion and provided with means for moving the coins therefrom, which means, in the present instance, comprises a disk 4 forming the inclined wall of the hopper, adapted to be rotated about a central axis and provided with devices or pockets for picking up the coins and lifting them from the hopper. The disk may be mounted and rotated in any suitable manner but in the construction here illustrated I have connected the same to a gear 5 by means of two projecting studs or pins 6 which prevent all relative rotatory movement of the two parts. The gear 5 is journaled on a stud 7 mounted in a bracket 8. The gear is driven by means of a handle 9 which is connected thereto by suitable gearing. In the present instance the handle has a pinion 10 which meshes with a pinion 11 on a vertical shaft 12 and this shaft has a second pinion 13 which meshes with the gear 5. Thus, the movement of the handle 9 causes the disk 4 to rotate about the axis of the stud 7. The disk is preferably supported at its edges upon an annular bearing frame 14 which is rigidly secured to the main frame and is provided with a peripheral flange 15 projecting beyond the outer surface of the disk. In service these boxes are necessarily subjected more or less to weather conditions and the mechanism will frequently become more or less rusty and there is a tendency for this rusting or corrosion to cause the parts to stick to the annular bearing frame 14 should the machine be temporarily placed out of service while in a damp condition. Where the corrosion is not sufficient to cause the parts to stick together it will nevertheless roughen the bearing surfaces in such a manner as to materially increase the friction and render the disk more difficult to operate. To overcome this objection we prefer to provide the frame 14 with a bearing surface of brass, bronze or similar material which will not corrode and which will not adhere to the disk, which is usually of wrought iron or steel. In the present instance we have provided the frame 14 with a series of separated bearing points which are here shown as comprising pins 16 of bronze, brass or the like set in the annular frame member 14 and projecting slightly above the surface thereof so that the disk will be supported out of engagement with the body portion of the frame 14 and will engage only the pins 16. This not only prevents corrosion and the objectionable results therefrom but materially reduces the friction under normal conditions.

The coin lifting devices or pockets with which the disk is provided may be of any suitable character but preferably they are such as to pick up a coin of any one of a series of denominations, depending upon the capacity of the machine. As here shown, these pockets are formed by means of two lugs arranged to coöperate with the flange 15 of the annular disk-supporting frame. One of these lugs, as shown at 17, is spaced some distance from the periphery of the disk and a second lug 18 is arranged between the lug 17 and the edge of the disk and a short distance in the rear of the lug 17 so that the space between the flange and the two lugs forms a pocket. The lugs project from the surface of the disk a distance sufficient to enable them to retain the coins of different sizes in position but not sufficient to retain two coins, one piled upon the other. The lug 18 is here shown as formed of two parts, that is, it has a groove, as shown at 19, extending lengthwise thereof, the purpose of which will presently appear. There are a series of these pockets arranged about the face of the disk and it will be apparent that inasmuch as the disk forms the inclined wall of the hopper the tendency of the coins in the hopper will be to lie flat against the face of the disk and in a position to be engaged by the lugs, as the disk revolves, and lifted from the hopper.

The coins which are moved from the hopper by the disk 4 are registered upon a suitable registering device which computes the value of the several coins, which may be of different denominations. This registering device may be of any suitable kind and, as here shown, it comprises the usual bank of counting wheels 20 mounted upon a shaft 21 journaled in frame members 22 extending above the main frame 1. Selective actuating mechanism is provided for imparting to the registering device the movement necessary to register the value of each coin and this selective actuating device comprises a differentially movable member adapted to be moved different distances by coins of different diameters. In the present embodiment of the invention the register shaft 21 has a bevel gear 23 meshing with a bevel pinion 24 mounted on a vertical shaft 25 on which is mounted a pinion 26 connected by a suitable yoke 27 with a pivoted measuring arm or lever 28, the connection being such that the pivotal movement of the arm will impart axial movement to the pinion. This arm is pivotally supported at one side of the center of the disk, as indicated at 29, extends across the top of the same and is provided at its opposite end with a spring 30 to hold the same normally in its lowermost position. The edge of the arm 28 is arranged in such relation to the disk 4 that the coins will engage the same as they are moved from the hopper by the disk and will move the arm about its pivotal center, thereby through the connecting yoke 27, moving the pinion 26 axially a different distance for each denomination of coin which the machine is designed to handle. Coöperating with the pinion 26 are a series of positively actuated racks, one for each denomination of coin, and these racks are so arranged that when the pinion has been moved to the limit of its movement by a coin of a given denomination it will have been moved into operative relation with a rack having a sufficient number of teeth to cause the pinion to advance the registering mechanism a number of units corresponding to the value of the coin. In the present instance these racks are rotatory and are formed on the face of a cylinder 31, as shown at 32. In the present arrangement of the mechanism the cylindrical rack support 31 is shown as mounted on the upper portion of the vertical shaft 12, which shaft serves, through the connection just described, to operate the register 20. The cylinder is preferably adjusted lengthwise of the shaft and to this end the shaft is screw-threaded for a portion of its length on each side of the cylinder, as shown at 33, and is provided with nuts 34, the adjustment of which will alter the position of the cylinder and the racks carried thereby and which, when tightened down, will retain the cylinder firmly in its adjusted position, the cylinder preferably being keyed to the shaft to cause it to rotate therewith. Thus, it will be apparent that the operation of the handle 9, which imparts movement to the disk or coin lifting member, will also impart movement to the actuating racks and when the actuating pinion has been moved into operative relation with one of these racks, will cause the operation of the registering mechanism.

A suitable detent is preferably provided to hold the pinion in its adjusted position during the operation of the register and to release the same at the end of that operation. In the present form of the mechanism the measuring arm 28 has a wide end portion, as indicated at 35, which is provided with teeth 36 arranged to be engaged by a pawl 37 mounted upon a stud 38 which projects through the supporting frame and has on its opposite end an arm 39 to which is connected one end of a spring 40, the other end of which is connected with a fixed part of the frame and tends to move the pawl toward the toothed end of the measuring arm. Obviously, if unimpeded the pawl will ride over the teeth 36 of the arm and will prevent the return movement thereof. To release the pawl from the teeth the arm 39 has secured thereto a finger 41, the end of which is arranged close to the cylindrical support 31 for the racks and has its end projecting above and close to the upper surface of the top of the disk so that it is arranged normally in the path of an elongated cam 42 which extends for some distance about the edge of the cylinder. The front end of the cam 42 is circumferentially arranged just beyond the last tooth of the longest rack so that it will engage the finger 41 and actuate the pawl only after all the racks have moved beyond the pinion 26, it being noted that the finger 41 is arranged close to this pinion. The length of the cam is such that the pawl will be held in its inoperative position for a period sufficient to allow ample time for the measuring arm to return to its normal position, thereby avoiding any possibility of the pawl reëngaging the toothed end of the arm before the pinion had passed beyond the lowermost rack, which would result in the pinion being actuated by said rack and a false registration made. Further, the length of the cam is such that the pinion will be held out of engagement with the toothed end of the arm until this arm has completed or practically completed its upward movement, and will be released only in time to engage the teeth just before the coin which has actuated the same passes beyond the arm, thereby preventing the pawl from riding over the teeth on the upward movement of the arm and eliminating the wear on the pawl and the teeth and the noise incident thereto.

Preferably, the coins are lifted off the inner lugs 17, of the pocket, and supported upon a fixed member during the operation of the measuring finger, it being understood that the rear lug of the pocket, 18, remains in engagement with the coin and continues the movement thereof. To this end a finger 43 is mounted on a fixed part of the frame and arranged in front of the disk so that the lug 17 will just clear the same. The finger has its end pointed so as to extend beneath the coin which rests on the lug 17 and cause the coin to ride over the finger. In practice it is very difficult to so support the movable disk and the finger that there will be no space between them. Consequently, there is a tendency on the part of very thin coins to become wedged between the finger and the disk. To overcome this tendency and to make it impossible for any coin, no matter how thin it may be, to become wedged or caught in any way upon the finger, the finger is mounted in an annular groove 44 formed in the face of the disk and extending between the lugs 17 and 18 so that it passes through each pocket on the disk. The width of the groove, of course, is much less than the width of the smallest coin and it will be apparent that the point of the finger riding along the inner wall of the groove will engage the edge of the coin and the coin will ride over the finger. The finger itself is provided with an upwardly extending portion or flange 45 which lies within the groove and will extend behind the coin, thus preventing the lower edge of the coin from entering the groove as the finger lifts the coin off the lug 17. As a further guard against the displacement of the coins as they move into registering position the measuring arm is provided with a plate 46, the lower edge of which projects some distance below that portion of the arm which is engaged by the coin and the lower forward corner of this plate is flared outwardly, as shown at 47, so that the coins will enter behind the same as they move upward with the disk and will be held against outward movement or lateral displacement when they engage the finger.

There is sometimes a tendency on the part of coins to adhere to the face of the disk and to move upward with the same when they are not properly seated in the pockets. To displace any coin which might thus adhere to the face of the disk in advance of the coin which is in the pocket the space between succeeding pockets is provided with a series of openings 48 which are spaced apart a distance less than the diameter of the smallest coin. Pivotally mounted in the rear of the disk are two spring-actuated fingers 49 having their ends or noses arranged to ride over the rear face of the disk and to enter each recess as it passes. The springs cause these fingers to enter the openings with some force and consequently they will engage and displace any coin which may be seated across or overlap the opening when the finger enters the same. Inasmuch as this series of openings completely fill the space between the two pockets any coin which may adhere to the face of the disk in such a position that it will be carried into registering position will be displaced by the fingers unless it is properly seated in one of the pockets. As a further safe-guard, however, means are provided for locking the registering mechanism against operation by any coin which might enter registering position without being properly seated in the pocket, or by any foreign matter which might be carried into engagement therewith. This might be due either to a coin in some way getting past the kickers or spring-pressed fingers on the back of the disk or the kickers might partially displace the coin and cause it to engage the arm in such a position that it cannot be carried past the same and into the discharge chute. Yet it would impart some movement to the arm and place the pinion in a position to be engaged by one of the racks. To lock the register against operation under such conditions we have mounted on the rack cylinder a vertical bar 150 which extends across the full width of the cylindrical support in advance of the several racks and will engage the pinion if this be moved into operative relation with one of the racks before this bar has passed the pinion. The bar engaging the pinion not only locks the pinion against movement but checks the further movement of the racks and ties up the operation of the whole machine. Owing to this same tendency of the coins to adhere to the face of the disk under certain conditions they will sometimes stick to the disk at a point inside the line of the pockets and, consequently, will be carried around and around without being moved to registering position. Further, an accumulation of coins in the pocket will sometimes cause them to pile up along one side of the disk so that coins will climb across the face of the disk and be forced into registering position from the bottom without being carried upward by the pockets. To prevent either of these results the face of the disk has been provided with a cone 50 of a diameter substantially equal to the distance between two diametrically opposite lugs 17, thus causing the cone to cover substantially all the face of the disk which lies inside of the line of the coin pockets. This cone is preferably a shallow one and is secured to a projection or bracket 51 which is mounted on the disk beneath the same, the connection being made by a screw 52 which passes through the apex of the cone. Thus, the entire surface of the cone is smooth and its lower edges are beveled so that they fit snugly against the face of the disk. As a result it is impossible for a coin to lie flat upon the central portion of the disk as it can at best have only a line contact with the cone and this is not sufficient to enable the disk to adhere thereto because the coin will rock about this line of support and loosen itself should it be held thereto by any sticky substance and because it cannot lie flat a vacuum cannot be formed back of the same in such a manner as to hold it to the disk. Further, the cone will force the coins outward in such a manner that they will drop away therefrom should there be any tendency for the coins to pile up along one side of the disk.

When a considerable quantity of coins are deposited in the hopper it not infrequently happens that they will become wedged between the outer wall of the hopper and the disk in such a manner as to cause binding and sometimes lock the disk against movement. To overcome this we have so constructed the front wall of the hopper that it will yield without permitting the escape of the coins. To this end the front wall of the hopper is secured to the disk supporting frame 14 near the top of the hopper by means of a screw 53, which screw is not tightly seated but will allow a slight pivotal movement of the hopper about the upper edge thereof where it bears against the frame. The lower portion of the hopper is secured to the frame by means of screws 54 passing through the same into the frame 14 and having bearing portions on which the lower portion of the hopper has sliding movement, this movement being preferably limited by shoulders 55 formed on the screws. Springs 56, coiled about the screws between the wall of the hopper and the heads of the screws, tend to hold the hopper normally in its innermost position but will permit the same to yield when excessive pressure is applied to the inside thereof. This yielding of the hopper wall increases the space between the same and the disk and loosens any coins which may have become wedged, to permit the same to pass on. As soon as the coins have become loosened the springs will return the hopper wall to its normal position. To prevent the escape of coins when the hopper wall is thus moved outward it is provided along its lower edge with a flange or shoulder 57 which overlaps the flange 15 of the supporting frame 14 for the disk and is of such a width that it will never be moved beyond the outer edge of this flange.

After the coins pass out of engagement with the measuring finger 28 they drop into a coin chute, the outer face of which is formed by a plate or plates 58 and the inner circumferential wall of which is formed by a continuation of the finger 43, as indicated at 43ª, which wall extends into the groove 44 in the disk and thus effectually prevents the coins from becoming wedged therein or from being forced into the chute from the hopper when the coins pile up in the hopper. The lower portion of the chute is closed by an arm or plate 59 which projects across the same and is inclined downwardly and outwardly so as to deflect the coins into a continuation of the chute which leads to the cash-drawer 2. It is necessary for the lugs 18 to pass beneath the arm 59 and to avoid forming in the arm an opening large enough to permit the edge of a coin to enter and thus cause the coin to become wedged the lugs are divided longitudinally or provided with a central groove 19, as above described, and the arm 59 has a projection 60 arranged to enter these grooves. Thus, there is no space wide enough for the edge, even of a thin coin, to enter and there is no possibility of the coins becoming wedged in the chute and they cannot pile up because the inclined base or arm 59 causes them to slide downward and outward, or if they stick at the bottom they will be forced out by the following coins.

The operation of the several parts of the device has been explained in connection with the description thereof and it will be apparent that the modifications and additional safeguards provided are such as to render the operation certain, to cause all coins to be registered and to prevent a false registration. Further, that the movement of the parts is facilitated and the probabilities of the parts sticking, either due to corrosion or to the piling up or wedging of the coins, is practically eliminated.

While one embodiment of the invention has been illustrated it will be understood that this has been chosen for the purpose of illustration only and that the invention is not limited to the particular construction here shown as various modifications will occur to one skilled in the art.

Having thus fully described our invention, what we claim as new and desire to secure by Letters Patent, is:—

1. In a coin registering mechanism, a coin receptacle having means to move coins therefrom, a register, a coin controlled device for actuating said register, said device comprising a lever movable into different positions, a detent arranged to engage said lever and hold the same in an adjusted position, and means to release said lever from said detent at the completion of the registering operation and retain said detent in its operative position until said lever has returned to its normal position and has again been moved from said normal position.

2. In a coin registering mechanism, a hopper comprising a rotatable disk to move coins of different diameters from the hopper, a register, selective operating mechanism for said register comprising a differentially movable member arranged to be engaged by the coins as they are moved by said disk, means to hold said movable member in adjusted position until the operation of said register has been completed, and means to release said movable member from said holding means at the completion of the registering operation and retain said holding means in its inoperative position until said movable member has returned to its normal position and has again been moved from said normal position.

3. In a coin registering mechanism, the combination, with a coin receptacle having means to move the coins therefrom, a register, actuating mechanism therefor comprising a series of movable racks, a pinion having axial movement into operative relation with any one of said racks, and a coin-controlled arm to impart axial movement to said pinion, said arm having teeth in one edge thereof, and a spring-pressed pawl to engage the teeth of said arm to hold the same in adjusted positions, of a part connected with said racks to actuate said pawl to move it into its inoperative position at the completion of the registering operation and to hold it in such inoperative position until said pinion is again in a position to be engaged by one of said racks.

4. In a coin registering mechanism, the combination, with a coin receptacle having means to move the coins therefrom, a register, a pinion operatively connected with said register and capable of axial movement, a series of racks rotatably mounted adjacent to said pinion, a coin-actuated arm connected with said pinion to move the same into operative relation with a selected rack, said arm having teeth in one end thereof, and a spring-pressed pawl to engage said teeth, of a finger connected with said pawl, and a cam associated with said racks and arranged to engage said finger when the longest rack has passed said pinion and to remain in engagement therewith until said arm has again moved said pinion into operative relation with a selected rack.

5. In a coin registering mechanism, a hopper having a movable member to move the coins therefrom and provided with coin lifting devices, a register, a pinion connected with said register and capable of axial movement, a series of racks arranged to engage said pinion, and means actuated by the coins on said movable member for moving said pinion into operative relation with a selected one of said racks, of means to lock said registering mechanism against operation if axial movement is imparted to said pinion by any means other than by a coin properly seated in one of said coin lifting devices.

6. In a coin registering mechanism, the combination, with a coin receptacle having a movable member provided with pockets to move the coins from said receptacle, a register, a series of rotary racks operable in timed relation with the movement of said movable member, a pinion connected with said register and capable of axial movement, and an arm arranged to be engaged by a coin seated in one of said pockets to impart axial movement to said pinion, of a locking bar mounted in front of said racks and arranged to engage said pinion and lock said pinion and said racks against further movement if said arm is actuated to impart axial movement to said pinion by any means other than by a coin properly seated in one of said pockets.

7. In a coin registering mechanism, the combination, with a receptacle having a movable member to move the coins therefrom, of a register, and a register operating mechanism comprising an arm arranged to be engaged by the edges of the coins as they are carried by said movable member, and a guard plate carried by said arm and arranged to extend along the upper portion of the face of a coin while the latter is in engagement with said arm to prevent the lateral displacement of the coin.

8. In a coin registering mechanism, the combination with a receptacle having a movable member to move the coins therefrom, of a register, register operating mechanism comprising an arm arranged to be engaged by one portion of the edge of a coin as the latter is moved by said movable member, a fixed part arranged adjacent to said movable member to engage that portion of the edge of said coin opposite the portion engaged by said arm, while the coin is in engagement with the arm, and a guard plate carried by said arm and extending along the face of said coin.

9. In a coin registering mechanism, the combination, with a register, and coin controlled means for actuating the same, of a hopper comprising a movable member to move the coins therefrom, and a wall diverging from said movable member, pivotally supported at its upper end and having its lower end movable toward and away from said movable member, and means to yieldingly hold said movable portion of said wall against movement.

10. In a coin registering mechanism, the combination, with a register, and coin controlled means for actuating the same, of a hopper comprising a rotary disk, a supporting frame for said disk, and a wall for said hopper diverging upwardly from the lower edge of said disk, means for loosely connecting said wall to said frame, and springs engaging the lower portion of said wall to hold the same yieldingly against outward movement.

11. In a coin registering mechanism, the combination, with a register, and coin controlled means for actuating the same, of a hopper comprising a rotary disk, a supporting frame for said disk, and a wall for said hopper diverging upwardly from the lower edge of said disk, means for loosely connecting said wall to said frame, and springs engaging the lower portion of said wall to hold the same yieldingly against outward movement, said frame and said hopper wall having overlapping portions to close the space between said frame and said hopper wall when said wall is moved relatively to said frame.

12. In a coin registering mechanism, the combination, with a register, and coin controlled means for actuating the same, of a hopper comprising a rotary disk, a supporting frame for said disk, a wall for said hopper diverging upwardly from the lower edge of said disk, means for loosely connecting said wall to said frame, screws extending loosely through said hopper wall into said frame, and springs coiled about said screws and confined between the heads thereof and said wall, said screws having shoulders to limit the outward movement of said wall.

13. In a mechanism for lifting coins, a coin receptacle having downwardly converging walls, one of said walls comprising a rotary disk, coin-engaging devices arranged about the outer portion thereof and adapted to lift the coins out of said receptacle, and a guard to prevent the accumulation of coins on said disk inside of said coin-engaging devices and to cause such coins to fall back into the receptacles, said guard comprising a substantially conical surface.

14. In a mechanism for lifting coins, a coin receptacle having downwardly converging walls, one of said walls comprising a rotary disk, coin-engaging devices arranged about the outer portion thereof and adapted to lift the coins out of said receptacle, and a guard to prevent the accumulation of coins on said disk inside of said coin-engaging devices and to cause such coins to fall back into the receptacle, said guard comprising a surface mounted at an inclination to the surface of said rotary disk, the inclination of said inclined surface being such that when the same is in its lower position it extends substantially vertically.

15. In a coin lifting device, a coin receptacle comprising a rotatable disk, a bearing frame for said disk and a series of spaced non-corrodible pins fixed to said bearing frame, projecting above the surface of the same and forming a bearing for said disk.

16. In a coin registering mechanism, a register, a coin-controlled actuating device therefor and a coin receptacle comprising a rotatable disk having a series of coin-lifting devices mounted on the front surface thereof to move the coins into position to operate the register-actuating device, said disk having a plurality of series of openings, a series of openings being arranged between adjacent coin-lifting devices, the openings of each series being spaced apart distances less than the diameter of the smallest coin which the disk is designed to lift, and a spring-pressed finger mounted on a fixed part of the frame to the rear side of said disk and having its end arranged to successively enter said openings.

17. In a coin registering mechanism, the combination, with a register, and a coin controlled device for actuating the same, of a coin receptacle comprising an inclined rotary disk having projections arranged to form a coin receiving pocket, said disk having a circumferential groove formed therein and extending through said pocket, a finger rigidly supported adjacent to said register actuating device and having a portion extending into said groove, and adapted to extend beneath and engage the edge of the coin seated in said pocket.

18. In a coin registering mechanism, the combination, with a register, and a coin controlled device for actuating the same, of a coin receptacle comprising an inclined rotary disk having projections arranged to form a coin receiving pocket, said disk having a circumferential groove formed therein and extending through said pocket, a tapered finger rigidly supported adjacent to said register actuating device with one edge extending into said groove and with its point close to the inner wall of said groove, said finger having a flange projecting from that portion thereof which is seated in said groove toward the outer wall of said groove.

19. In a coin registering mechanism, the combination, with a register, and coin controlled means for actuating the same, of a coin receptacle having a rotatable disk to move the coins into a position to control said actuating mechanism, said disk having a coin receiving pocket and a circumferential groove formed in the face thereof and extending through said pocket, a coin chute to receive the said coins when they pass the controlling position, said chute comprising an outer wall arranged parallel with and spaced away from said disk, and a finger rigidly supported by said outer wall adjacent to the controlling position of said coins and having its edge projecting into the groove in said disk, said finger being provided with an extension having one edge projecting into said groove and the other edge secured to the wall of said chute, whereby said extension forms the bottom of said chute.

20. In a coin registering mechanism, the combination, with a register, and a coin controlled device for actuating the same, of a coin receptacle comprising a rotatable disk, said disk having a circumferential series of coin moving lugs projecting from the face thereof, each of said lugs having a longitudinal groove, a chute to receive said coins after they pass said actuating mechanism, and a plate arranged at the lower end of said chute extending across the path of said lugs and having a lug extending inward and arranged to enter the grooves in said first-mentioned lugs.

21. In a coin registering mechanism, the combination, with a register, and a coin controlled actuating device therefor, of a coin receptacle comprising a rotatable disk having a circumferential series of coin engaging lugs, each lug having a longitudinal groove dividing the same into two parts, a chute arranged to receive the coin when it has passed said actuating device, said chute comprising a curved plate arranged substantially parallel with and spaced away from said disk, a downwardly inclined base plate extending across the lower end of said chute and having a lug projecting inwardly and arranged to pass between the two portions of each of the first-mentioned lugs.

In testimony whereof, we affix our signatures in presence of two witnesses.

PHILIP J. MITTEN.
JOHN E. McALLISTER.
GEORGE E. IRELAND.

Witnesses:
F. W. Schaefer,
H. L. Hammaker.

Copies of this patent may be obtained for five cents each, by addressing the "Commissioner of Patents, Washington, D. C."